US011114943B2

(12) United States Patent
Paolo et al.

(10) Patent No.: US 11,114,943 B2
(45) Date of Patent: Sep. 7, 2021

(54) INDUCTIVE CURRENT SENSING FOR DC-DC CONVERTER

(71) Applicant: Dialog Semiconductor (UK) Limited, London (GB)

(72) Inventors: Francesco Paolo, Swindon (GB); Julian Tyrrell, Swindon (GB)

(73) Assignee: Dialog Semiconductor (UK) Limited, London (GB)

( * ) Notice: Subject to any disclaimer, the term of this patent is extended or adjusted under 35 U.S.C. 154(b) by 0 days.

(21) Appl. No.: 16/163,971

(22) Filed: Oct. 18, 2018

(65) Prior Publication Data
US 2020/0127567 A1   Apr. 23, 2020

(51) Int. Cl.
*H02M 3/158* (2006.01)
*H02M 1/32* (2007.01)
*H02M 1/00* (2006.01)
*H02M 3/156* (2006.01)

(52) U.S. Cl.
CPC ........... *H02M 3/1582* (2013.01); *H02M 1/32* (2013.01); *H02M 1/0009* (2021.05); *H02M 3/1566* (2021.05)

(58) Field of Classification Search
CPC .... H02M 3/156; H02M 3/158; H02M 3/1588; H02M 3/155; H02M 3/1582; H02M 3/157; H02M 3/1563; H02M 1/12; H02M 1/42; H02M 1/4225; H02M 1/4233; H02M 1/4241; H02M 1/4258; H02M 1/425; H02M 1/4208; H02M 2001/4283; H02M 2001/4291; H02M 2003/1552
USPC ............................ 323/288, 271, 282, 284–28
See application file for complete search history.

(56) References Cited

U.S. PATENT DOCUMENTS

| | | | |
|---|---|---|---|
| 5,469,334 A | 11/1995 | Balakrishnan | |
| 6,215,290 B1* | 4/2001 | Yang | H02M 3/1584 323/282 |
| 6,545,464 B1* | 4/2003 | Tigges | H03K 17/9505 324/207.12 |
| 10,141,841 B1* | 11/2018 | Ongaro | G06F 1/26 |
| 2004/0055395 A1* | 3/2004 | Tankard | G01R 15/181 73/862 |

(Continued)

FOREIGN PATENT DOCUMENTS

DE    10 2012 210 261    12/2013

OTHER PUBLICATIONS

"Fundamentals of Power Electronics," by Robert W. Erickson et al., University of Colorado, Boulder, Colorado, Kluwer Academic Publishers, Copyright 2004, USA, Chapter 12, pp. 439-480.

(Continued)

*Primary Examiner* — Bryan R Perez
(74) *Attorney, Agent, or Firm* — Saile Ackerman LLC; Stephen B. Ackerman

(57) ABSTRACT

An inductive current sensing method for a DC-DC switching converter is described. A sense coil is placed adjacent to a PCB track between the switching converter output and a load powered by the switching converter. A change in a magnetic field is measured around the track, generating a voltage proportional to a change in a load current. The load current is subtracted from an inductor current, when a current needed on the switching converter output is higher than a current in a steady state. In this way, output voltage undershoot or overshoot in the DC-DC switching converter is minimized.

19 Claims, 14 Drawing Sheets

(56) References Cited

U.S. PATENT DOCUMENTS

| | | | |
|---|---|---|---|
| 2006/0038649 A1 | 2/2006 | Mehrotra et al. | |
| 2007/0024254 A1 | 2/2007 | Radecker et al. | |
| 2008/0031020 A1* | 2/2008 | Lee | H02M 3/156 363/40 |
| 2010/0046262 A1* | 2/2010 | Wu | H02M 1/083 363/126 |
| 2014/0292300 A1 | 10/2014 | Yan | |
| 2015/0108974 A1* | 4/2015 | Kennedy | G01R 33/098 324/252 |
| 2016/0307690 A1* | 10/2016 | Madsen | H02M 3/33523 |

OTHER PUBLICATIONS

German Office Action, File No. 10 2019 207 375.1, Applicant: Dialog Semiconductor (UK) Limited, dated Mar. 11, 2020, 8 pages.

\* cited by examiner

FIG. 10B Cross-section 1020

FIG. 10A 3D view 1010

INDUCTIVE CURRENT SENSING FOR DC-DC CONVERTER

BACKGROUND

Field

The present disclosure relates generally to a DC-DC switching converter, and more specifically to a DC-DC switching converter having a control loop with a bandwidth to maintain regulation stability, with a sense coil placed between the switching converter output and the load.

Background

If a positive load transient step is applied to a DC-DC converter, for example a step-down, or buck converter that outputs a lower voltage than the input, the output voltage will undershoot until an increase in the inductor(s) current can occur. For this case, the control loop is attempting to balance the input current into the switched inductor to the output load current, so that the required output voltage is maintained. This is the steady-state situation, and the bandwidth of the control loop dictates the system response. The same applies for other DC-DC converter topologies, for example a step-up or boost converter, a buck-boost converter and any other type, and also for any type of multiple output converters.

Other techniques to minimize the output voltage undershoot in a DC-DC switching converter beside a standard control loop, may include:
1. A 'panic' comparator having a threshold just below the target output voltage, and triggering a requisite response, by either turning the high-side switch on for longer, or turning on an additional switching phase with a small inductor.
2. A differential stage, detecting the increased slope of the voltage, which is caused by the increased current load on the reservoir capacitor.
3. Using a reservoir capacitor with a relatively large ESR (Equivalent Series Resistance), or adding a small resistor to a low ESR capacitor, so that the load current produces a physical voltage drop that can be detected, and used to trigger the 'panic' circuit.

All these techniques look at the output voltage on the reservoir capacitor to decide the appropriate action to be taken by the control loop of the DC-DC switching converter.

SUMMARY

Accordingly, it is an object of one or more embodiments of the present disclosure to provide a DC-DC switching converter having inductive current sensing logic, to improve transient load response characteristics of a DC-DC switching converter, by means of directly sensing the load current variation (e.g. load step).

It is a further object of one or more embodiments of the disclosure to improve sensing of a fast response on the output signal of a DC-DC switching converter, having inductive current sensing, for fast and high transient load steps.

Still further, it is an object of one or more embodiments of the disclosure to decrease the voltage change on the output signal DC-DC switching converter, when applied fast and high transient load steps occur, for example on processor chip core supplies.

Other objects will appear hereinafter.

The above and other objects of the present disclosure may be accomplished in the following manner. A DC-DC switching converter is disclosed, comprising a sense coil placed adjacent to a PCB track between an output of the switching converter and a load powered by the switching converter. The DC-DC switching converter further comprises a load current compensation circuit, configured to minimize an undershoot or an overshoot voltage on the switching converter output. The DC-DC switching converter further comprises a current sense integrator, configured to measure a change in a magnetic field around the PCB track, and to generate a voltage proportional to a change in the load device current. The inductive current sensing logic still further comprises a type II compensator.

The above and other objects of the present disclosure may be further accomplished by a method for inductive current sensing, in a DC-DC switching converter, comprising a control loop with a sense coil. The steps include placing the sense coil adjacent to a PCB track between the switching converter output and a load, powered by the switching converter. The steps also include measuring a change in a magnetic field around the track, and generating a voltage proportional to the change in a load current. The steps also include subtracting the load current from an inductor current, when a current needed on the switching converter output is higher than a current in a steady state. The steps also include minimizing an output voltage undershoot or overshoot in the DC-DC switching converter.

In various embodiments the function may be used for to activate an internal load to reduce a load overshoot, to discharge an output capacitor in a switching converter.

In various embodiments the function may be used in other types of switching converters, such as boost, buck-boost, and other current mode controlled types.

BRIEF DESCRIPTION OF THE DRAWINGS

The present disclosure will be more clearly understood from the following description taken in conjunction with the accompanying drawings in which like reference numerals designate similar or corresponding elements, regions and portions and in which.

DETAILED DESCRIPTION

The present disclosure provides a technique to minimize the output voltage undershoot or overshoot in a DC-DC switching converter, without considering the output voltage of the reservoir capacitor in deciding the appropriate action to take. Here, an air-cored sense coil is used to detect the magnetic field around the PCB track carrying the load current, directly sensing the load current. This results in improved transient load response characteristics, and less voltage change on the output signal, with applied fast and high transient load steps.

An air-cored sense coil means a coil with a core that does not limit the bandwidth or saturate with the magnetic flux. Typically the PCB material used in the construction of the sense coil has the same magnetic characteristics as air, i.e. a relative permeability $\mu_R$ of about 1.0. For reference ferrite has $\mu_R$ of about 640, and will saturate. It also has a bandwidth of 100 kHz to 1 MHz, which limits the sensing speed, which is why a non-cored design is used.

Figure 1:
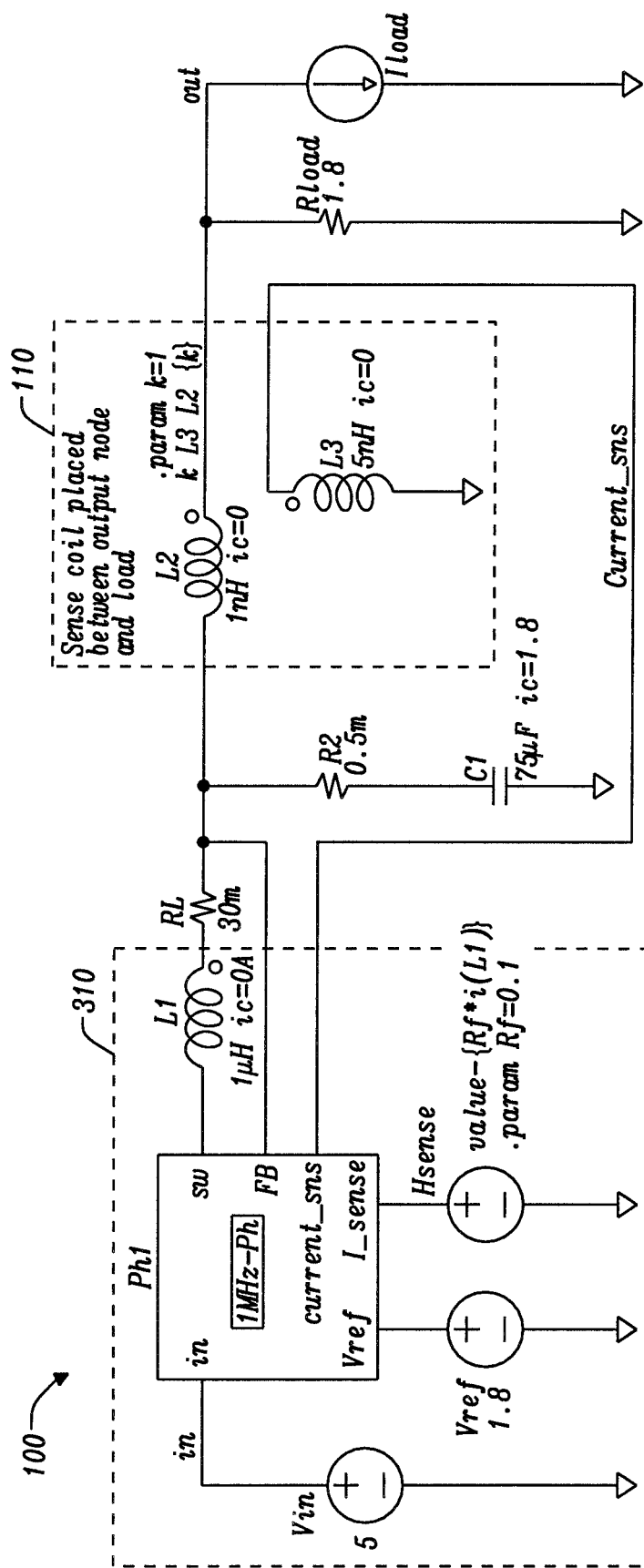
FIG. 1 illustrates a schematic diagram showing sense coil placement, in a DC-DC switching converter of the present disclosure.

FIG. 1 illustrates schematic diagram 100 showing sense coil placement 110, in a DC-DC switching converter of the present disclosure. For the control loop of the present disclosure, secondary current sense coil L3 is placed on the PCB track between switching converter output node out and load device RL being powered by the switching converter. The sense coil measures the change in the magnetic field around the power track, and generates a voltage proportional to the change in the load current. The secondary current sense coil is placed after the LC filter, made up of inductor L1 and capacitor C1, in order to detect the load current slew rate for the load profile of the switching converter, where a preferred embodiment is a peak current mode buck converter. L2 represents the inductance of the trace connecting the switching converter output to the load.

Block 310 represents a current controlled buck switching converter. Current_sns is the additional input needed to improve the load transient response. The current_sns pin is connected to the output of block 110. Block 110 is a circuit representation of the inductive current sense modelled as two coupled lumped inductors. The current flowing through L2 generates a voltage across L3 proportional to the variation of the current in time:

$$V(current_{sns}) = -M \cdot k \cdot \frac{dI_{load}}{dt}$$
$$0 \leq k \leq 1, M = \sqrt{L_2 \cdot L_3}$$

where k is the coupling factor and M is the mutual inductance.

Figure 2:
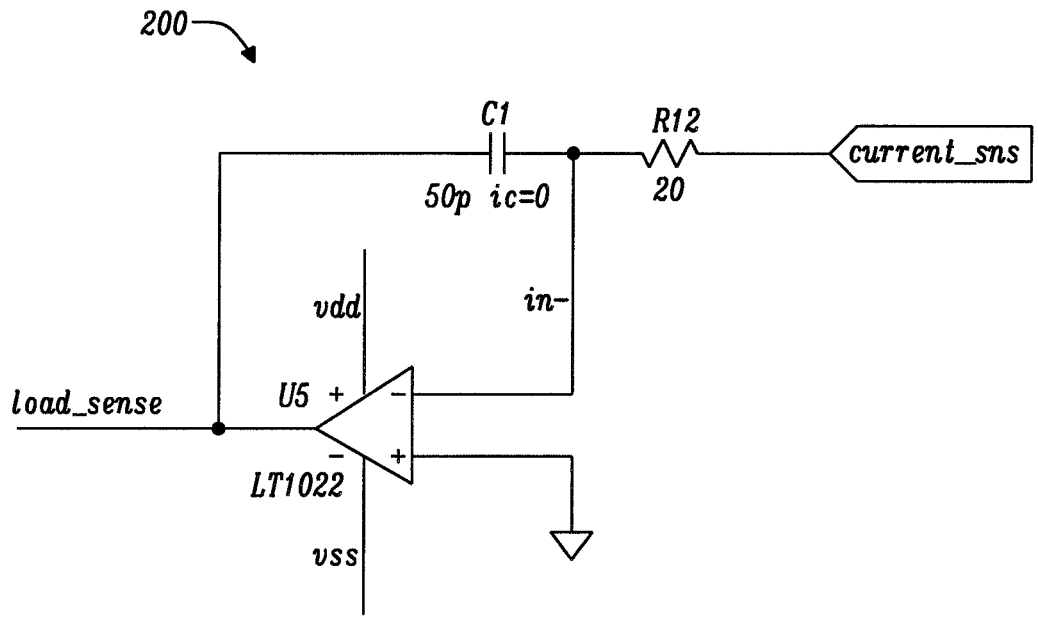
FIG. 2 shows a simplified integrator circuit, which can be used to detect the voltage across the secondary coil, to reproduce the load profile of the switching converter.

FIG. 2 shows simplified integrator circuit 200, which can be used to detect the voltage across secondary coil L2, to reproduce the load profile of the switching converter. As the voltage signal provided by sub circuit 110 is $$V(current_{sns}) = -M \cdot k \cdot \frac{dI_{load}}{dt},$$

the voltage is proportional to the variation of the load current. Block 200 integrates the signal V(current_sns), producing a voltage signal proportional to the load current:

$$V(load\_sns) = \frac{M \cdot k}{R12C1} \cdot I_{load}$$

Figure 3:
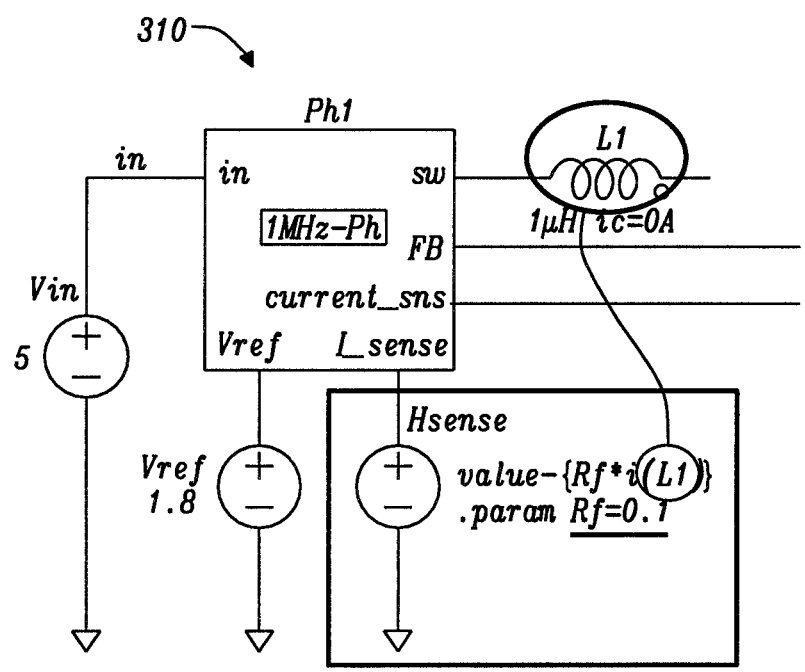
FIG. 3 illustrates the inductor current sense of FIG. 1, where the integrator is dimensioned to reproduce the load profile scaled by 10.

FIG. 3 illustrates inductor current sense 310, when integrator 200 is dimensioned to reproduce the load profile scaled by a factor of 10. The primary and secondary coil inductance values, L1 and L2, are fixed by the PCB design. The integrator reproduces the load step profile, ensuring the load current sense current_sns, and the inductor current sense I_sense used by the peak current mode modulator, have the same scale.

In a switching converter with current mode control, the inductor current is mirrored and forced into a resistor. The voltage representation of the current is $$V(coil\_current) = coil\_current * Rf$$

So, the proportionality between voltage and current depends on Rf. For example, if the coil_current=1 A and Rf=0.1, $$V(coil\_current) = coil\_current * Rf = 1 A * 0.1 Ohm = 0.1V$$

The load current is converted in voltage passing through different components which overall must have the same proportionality. As mentioned above, the voltage is proportional to the load current, taken from the transformer and integrated, and is equal to:

$$V(load_{sns}) = \frac{M \cdot k}{R \cdot C} \cdot I_{load}$$

This means that $$\frac{M \cdot k}{R \cdot C}$$

must be equal to Rf. M and k are parameters derived by the physical realization of the inductive sense, and R and C are integrator parameters that can be used to achieve the desired Rf. Scale matching between the load current and the inductor current is very important as the comparison of load current and inductor current is the key to detect an imminent load transient before the output voltage drastically is reduced.

Figure 4:
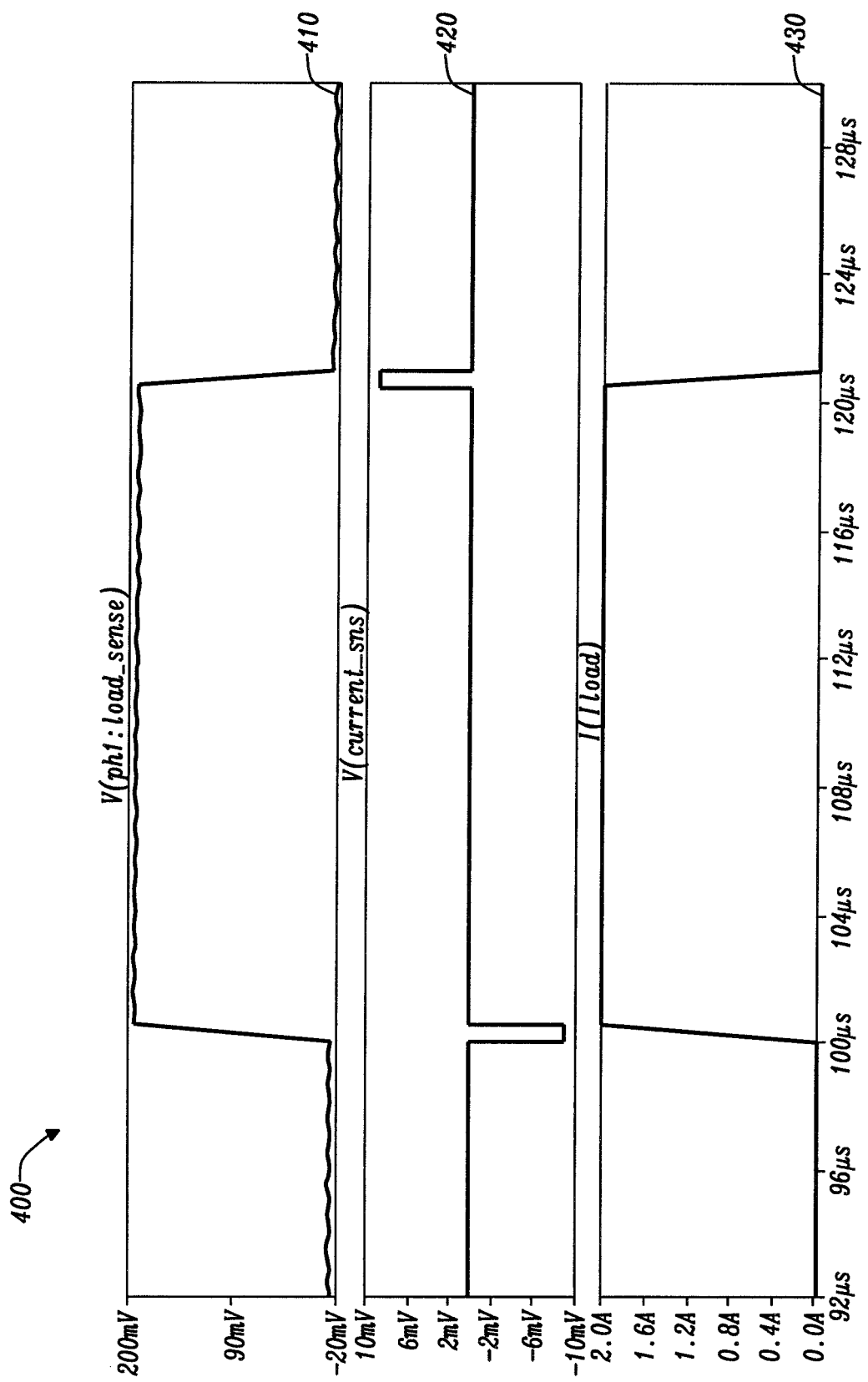
FIG. 4 shows the current sense signal, proportional to the load current slew rate of the switching converter.

FIG. 4 shows 400, the current sense signal proportional to the load current slew rate of the switching converter. The simulation shows that when load current Iload 430 goes high, a pulse of the sense current current_sns 420 goes low. When load current Iload 430 goes low, a pulse of current_sns 420 goes high. Current_sns 420 is shown to be proportional to load current slew rate Iload 430, and load sense voltage ph1:load_sense 410 tracks Iload 430.

Figure 5:
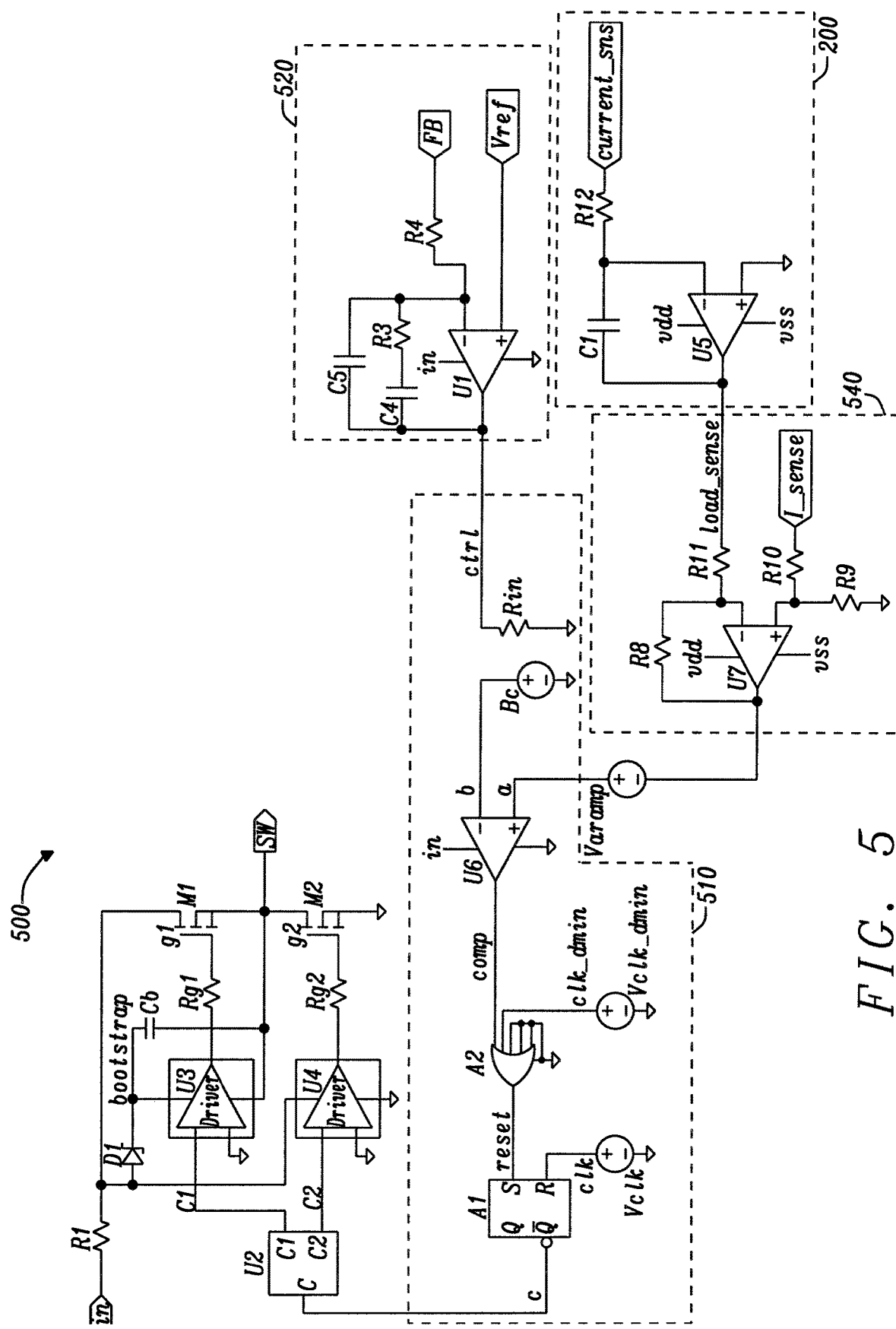
FIG. 5 illustrates a control loop schematic diagram for a circuit implementation of the load current compensation of the present disclosure.

FIG. 5 illustrates a control loop schematic diagram for a circuit implementation of the load current compensation of the present disclosure. The idea is to subtract load current from the inductor current in a peak current mode buck converter, when the current needed on the output of the switching converter is going to be higher than the current in steady state. The control loop simply lowers the comparator threshold, in U6, allowing the duty cycle to increase immediately, in order to react to the instantaneous current request. The current load profile is used as additional information, to react as fast as possible, to the imminent voltage change on the output of the DC-DC switching converter that follows a load step. 510 is the peak current modulator, 520 is a type II compensator with a 100 KHz crossover frequency, 200 is the current sense integrator, and 540 is the current control logic for (inductor sense)–(load sense).

Block 510, the peak current modulator, and block 520, the Type II compensator, are standard blocks of a generic current mode control switching converter. Block 200, as already explained, is the integrator of the current_sns signal, which is a voltage proportional to the variation of load current in a unity of time. Block 540 is the block that operates the subtraction of load current (load_sense) from inductor current (inductor sense). The operational amplifier is configured as a standard differential amplifier. If R8=R9 and R11=R10, the output is equal to:

$$V\_out = \frac{R_8}{R_{11}} \cdot (I_{sns} - I_{load\_sense})$$

In the example of FIG. 5, all the resistors are considered to have the same value, and $$\frac{R_8}{R_{11}} = 1.$$

The detection of an imminent load transient is calculated as a difference between inductive current and load current. In steady state condition, inductive current is equal to load current, neglecting the current ripple. When an abrupt step of current is applied to the output buck, instantaneously the inductor current doesn't change because the output voltage has not plummeted yet, and the extra current is taken from the output capacitor. The difference between inductor current and load current gives the information that the load has changed. If the scaling is not the same, the switching converter can misinterpret the information. If the load current has an equivalent sense resistor, and $$\frac{M \cdot k}{R \cdot C}$$

is bigger man the inductor current sense in Rf, the switching converter will over react, and the load compensation will be less.

Figure 6:
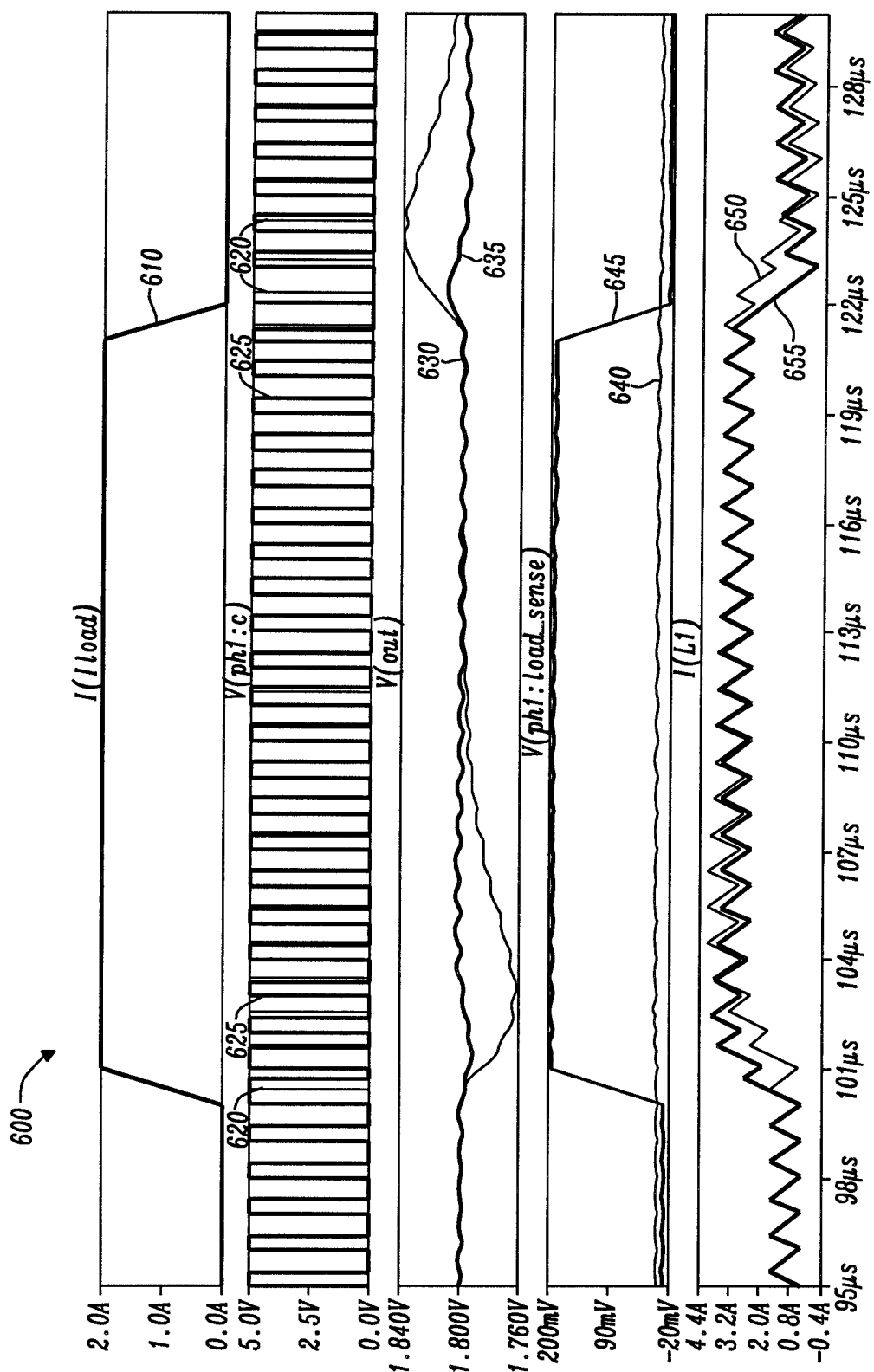
FIG. 6 shows a comparison of a load transient response with and without a load current compensation, with a slew rate of 2 A/us.

FIG. 6 shows comparison 600 of load transient response with load current compensation, and load transient response without load current compensation, for a slew rate of 2 A/us. Note that the load profile Iload 610 is the same in both cases. The load current compensation increases bandwidth and reduces output resistance during a load transient. Considering the case without load current compensation 620, it can be seen that inductor current I(L1) 650 doesn't change immediately when the peak current is controlled by a conventional output voltage feedback loop, and the inductor current increases only after voltage V(out) 630 has dropped. Considering the case with load current compensation 625 of the disclosure used in a peak current mode modulator, a scaled voltage replication of the actual current load profile can be seen. The switching converter reacts immediately providing extra current 655 to output 635, without waiting for the voltage drop to adjust the point of load, with the feedback loop based entirely on voltage sense 645.

The model used in this simulation, for the results shown in FIG. 6, is for a single-phase buck switching converter, with a 1 MHz switching frequency and 100 kHz bandwidth. If the slew rate of the load current exceeds the maximum di/dt of the switching converter, the duty cycle saturates to its maximum value, and the switching converter reacts at the maximum current rate. Even though it's possible to notice a voltage drop on the output node, it is much smaller in amplitude and shorter in time duration than using only conventional output voltage feedback.

Figure 7:
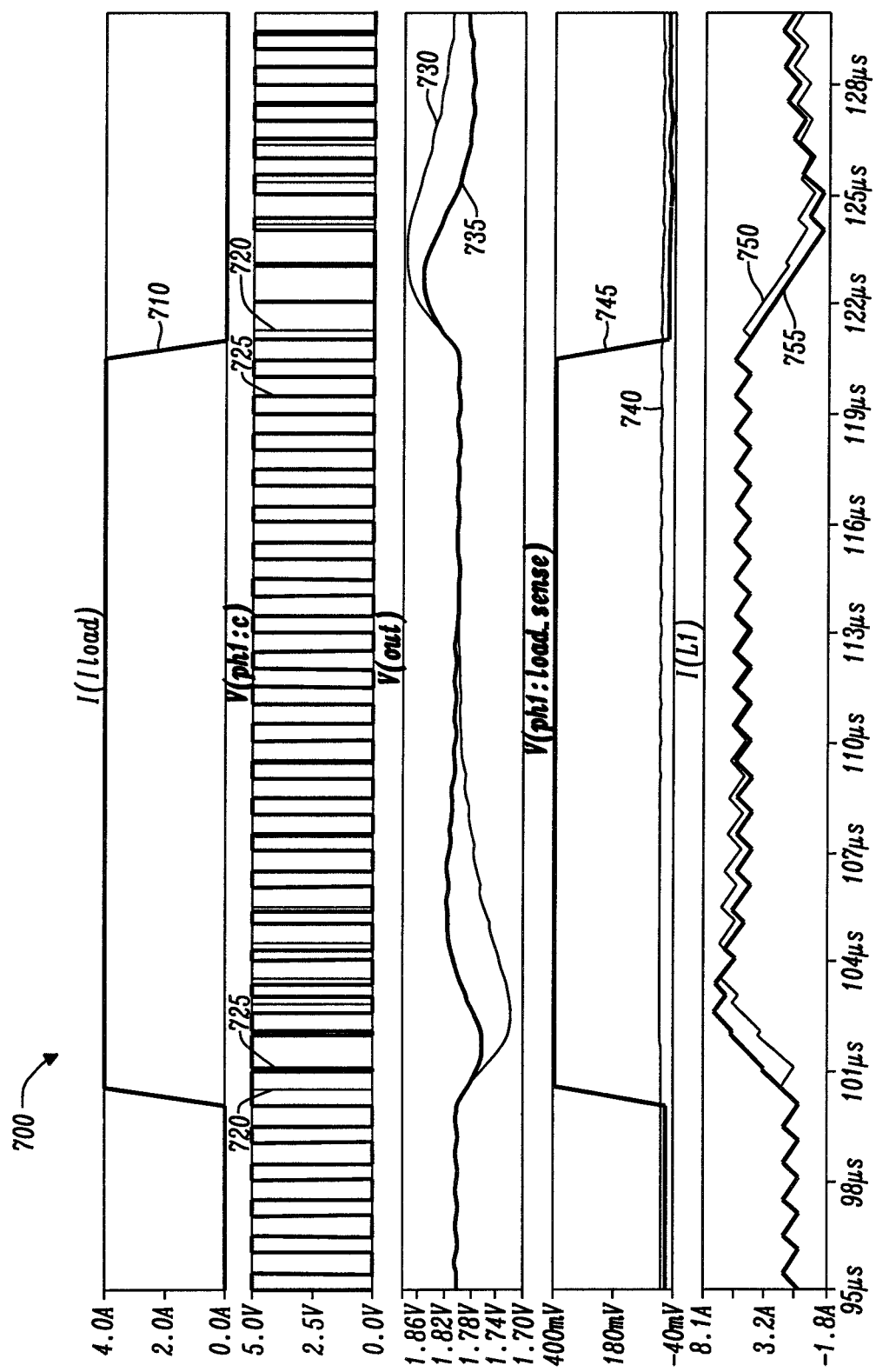
FIG. 7 illustrates a comparison of a load transient response with and without a load current compensation, with a slew rate of 8 A/us.

FIG. 7 illustrates comparison 700 of load transient response with load current compensation and load transient response without load current compensation, for a slew rate of 8 A/us. Note that the load profile Iload 710 is the same in both cases, and the load current compensation increases bandwidth and reduces output resistance during load transient. It can be seen that the recovery time on inductor current I(L1) 750, for the trace without load current compensation, is about 10 us (1/100 kHz) with voltage drop 730 of about 80 mV. In contrast, the trace with load current compensation shows a recovery time on I(L1) 755 of about 3 us with voltage drop 735 of about 35 mV.

Figure 8:
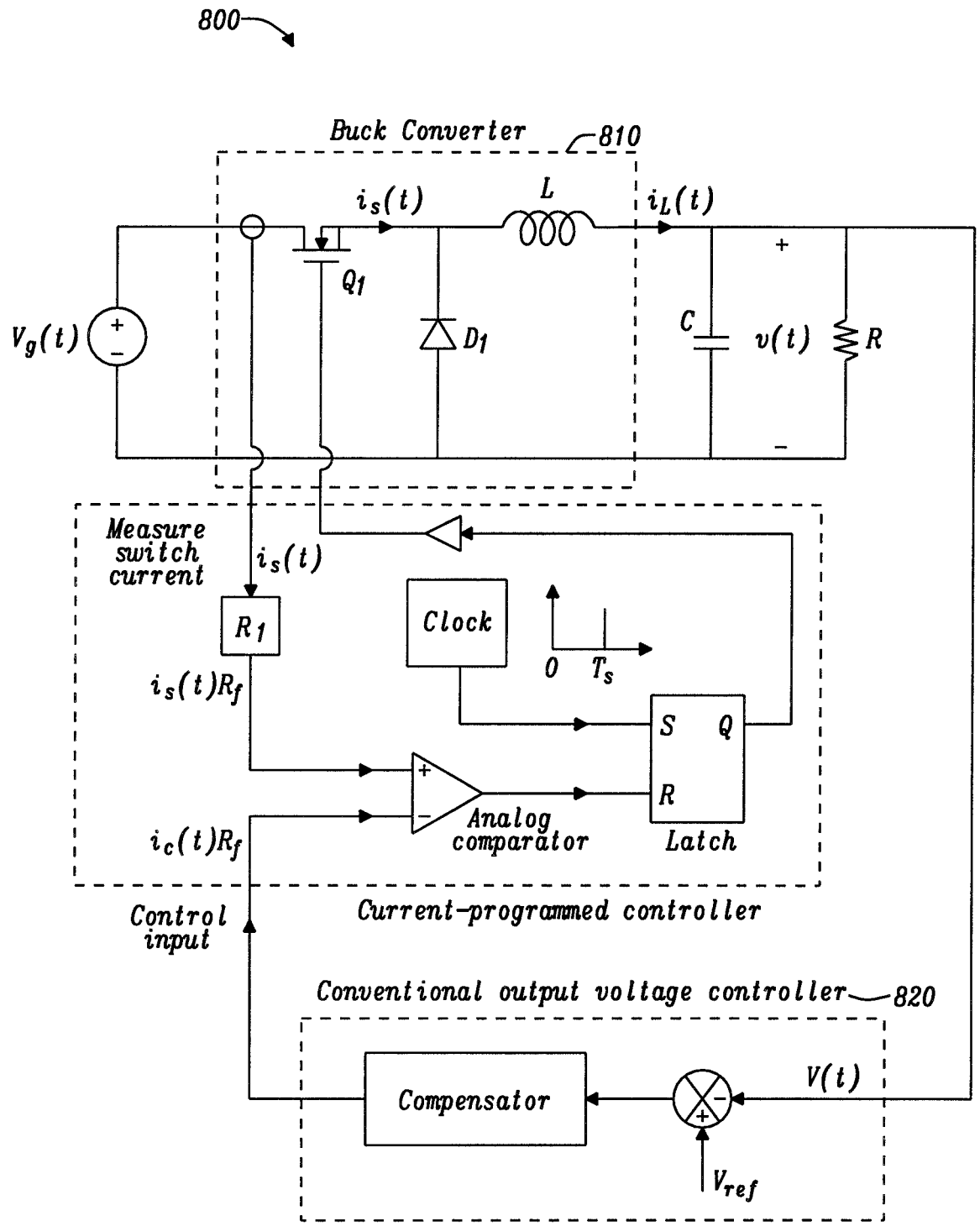
FIG. 8 shows a block diagram representing a peak current mode Buck DC-DC switching converter, with a conventional output voltage controller.

FIG. 8 shows block diagram 800 representing a peak current mode Buck DC-DC switching converter 810, with a conventional output voltage controller 820. This is taken from reference textbook "Fundamentals of Power Electronics—$2^{nd}$ ed.—Robert W. Erickson", and is the case where the load doesn't change immediately, the peak current is controlled by an output voltage feedback loop in 820, and the inductor current increases only after the output voltage has dropped. FIG. 8 is a well-known representation of a peak current-controlled buck converter.

Figure 9:
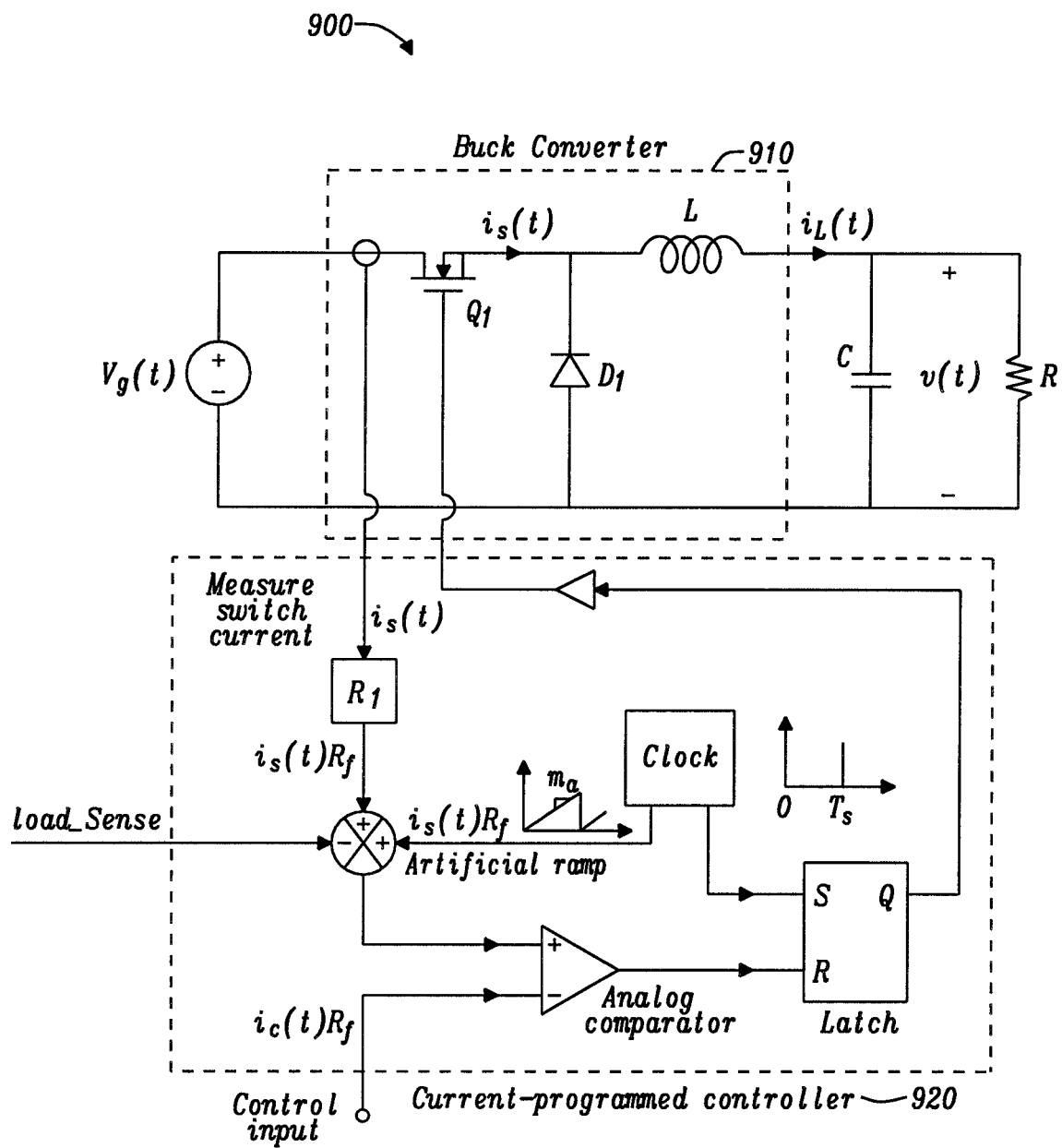
FIG. 9 illustrates a block diagram representing a peak current mode Buck DC-DC switching converter of the present disclosure, with an additional input to the current-programmed controller based on the load current.

FIG. 9 illustrates block diagram 900 representing a peak current mode Buck DC-DC switching converter 910 of the present disclosure, with an additional input Load_Sense to current-programmed controller 920 based on the load current. This is the case where load current compensation is used in the peak current mode modulator, and the switching converter reacts immediately providing extra current to the output, without waiting for the voltage drop to adjust the point of load. The inner current loop regulates the current peak according to a control input, and the outer voltage loop regulates the voltage. The load current compensation is represented as an additional input Load_Sense to current-programmed controller 920. This additional input, based on the load current, can react faster than the outer loop based on just output voltage, because the sense coil voltage is the result of current integration. FIG. 9 represents the same peak current-controlled buck converter of FIG. 8 including the load_sense signals showing how the signal is subtracted from inducted current sense.

Sense coil voltage can be also used to trigger the appropriate response to a load transient in a switching converter when switching the high-side of a MOSFET on, or switching an additional phase on that has a small inductor, with a higher bandwidth and faster response to the load transient. Switching instantaneously from PFM to PWM as soon as the current load is detected, or activating an internal load to reduce the load release overshoot to discharge the output capacitor, are additional examples of how the sense coil voltage application of the present disclosure can be used.

Figure 10:
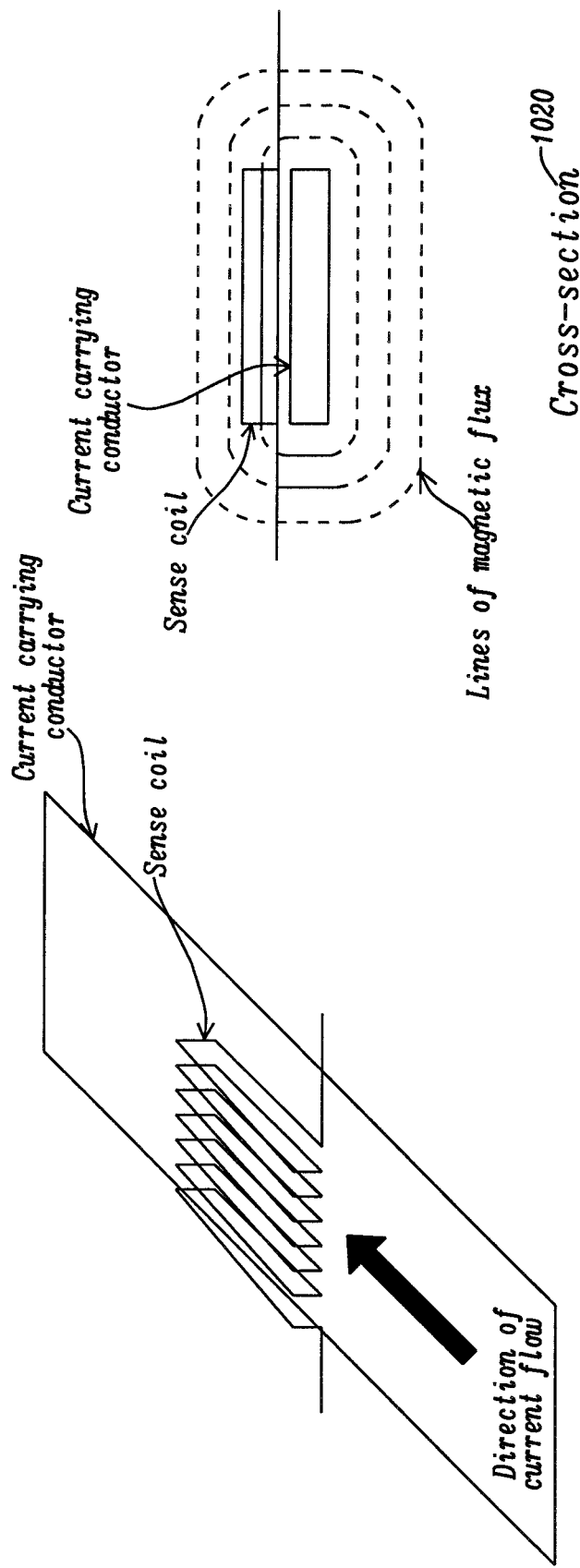
FIG. 10A and FIG. 10B show the physical design of the sense coil used in the present disclosure.

FIG. 10A and FIG. 10B show the physical design of the sense coil used in the present disclosure. A simple current sense prototype has been realized by building an air-cored coil on top of a PCB trace, between the switching converter and the load. This can be seen in 3-dimensional view 1010 of FIG. 10A, and cross-sectional view 1020 of FIG. 10B. Note the direction of current flow in the 3-dimensional view, and the current carrying conductor, at the center of the lines of magnetic flux, in the cross-sectional view. As the sense coil has no ferromagnetic material core, it does not suffer from a saturation effect. The air-cored coil has a very high bandwidth, and transient edge speeds outside the control loop bandwidth can be detected.

Figure 11:
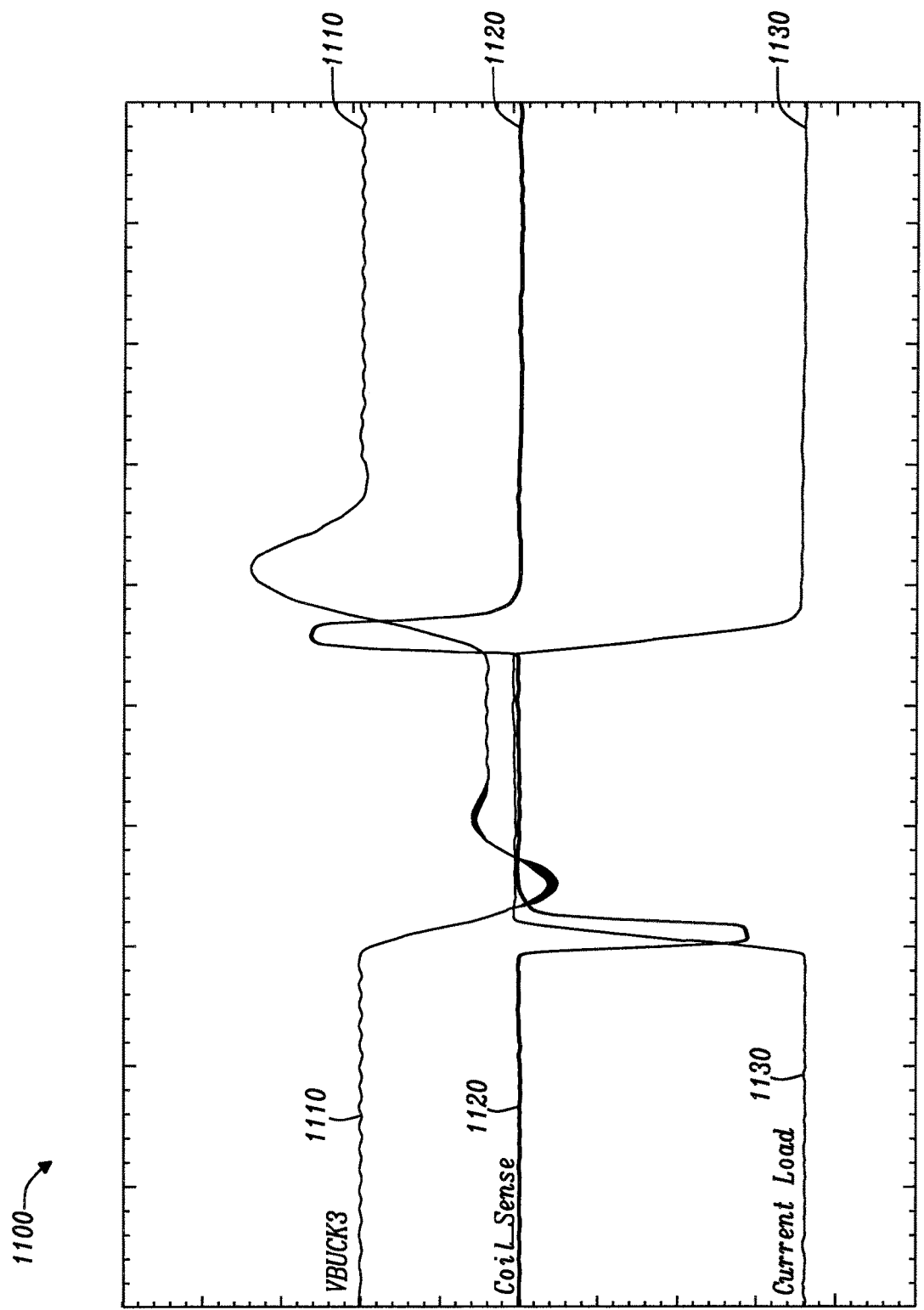
FIG. 11 illustrates a scope capture of the sense coil during a load step.

FIG. 11 illustrates scope capture 1100 of the sense coil during a load step. The measured results of a standard buck switching converter are given for the sense coil, where 1130 is a voltage representation of the Current Load pulse taken from a 100 mOhm sense resistor, and Iload=10*V (1130_trace). The voltage value of 1130 is the actual load current multiplied for 100 mOhm. The value of the actual load current is Iload=10*V(1130_trace) where V(1130_trace) is the voltage shown.

Signal 1110 represents VBUCK3, the output voltage on the capacitor, and signal 1120 represents Coil_sense, the voltage on the air-cored sense coil. It can be seen that output voltage 1110 has a significant undershoot and subsequent ringing for the load current step. The sense coil output voltage 1120 clearly has the bandwidth to follow the current transition edge. Note that in FIG. 11, the sense coil is not used by the buck switching converter to improve the response characteristics of the output.

FIG. 11 simply shows a step of load current 1130 applied to the output of the buck converter 1110. The signal 1120 is the output of the inductive current sense, but 1120 is not put back on an input to the buck converter. In FIG. 11, the load current information is not used to improve the load transient because the extra control based on the load current sensing was not implemented to generate FIG. 11. FIG. 11 demonstrates the characteristics of the inductive current sense, and not to show the improvement of the load transient response.

Figure 12:
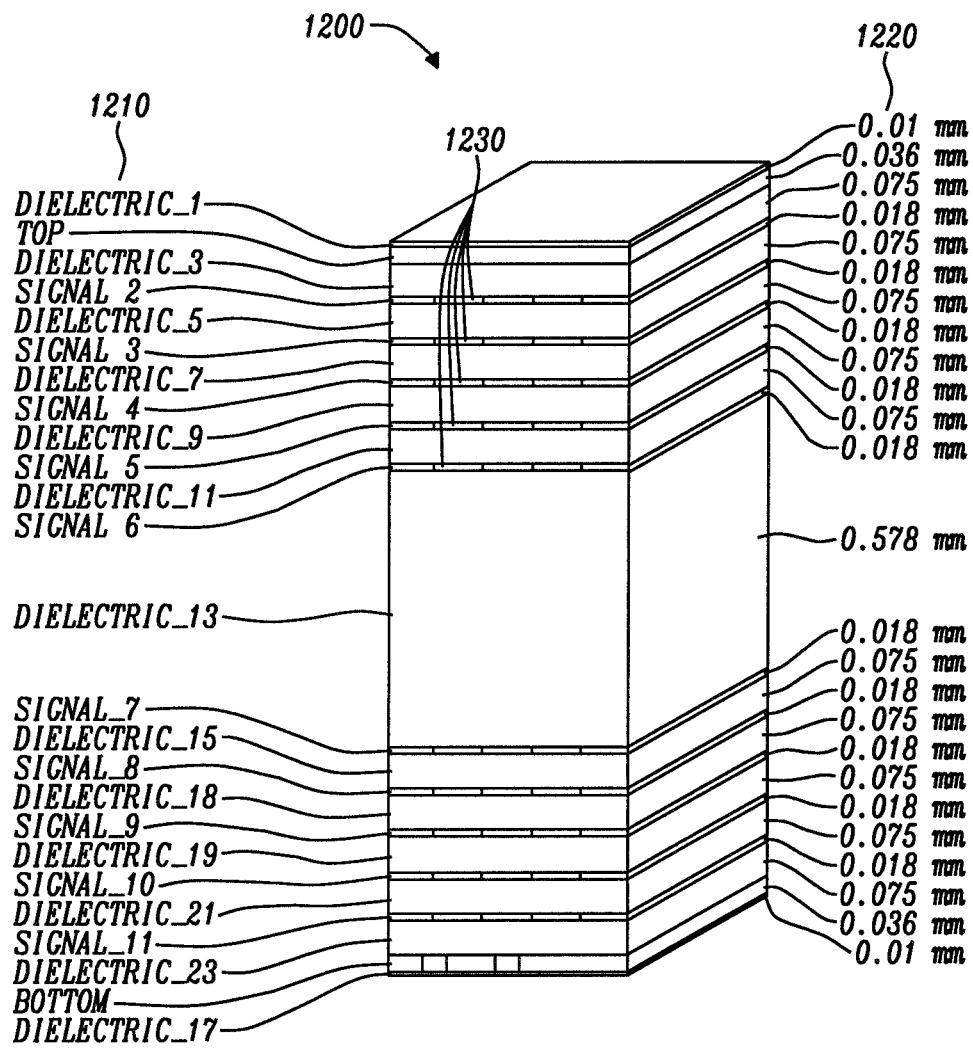
FIG. 12 shows the stack-up of a generic multilayer board.

FIG. 12 shows an example stack-up 1200 of a generic multilayer board. A coil topology for a sense coil has been developed, by building a coil with PCB traces and intervening dialectric layers 1210 and via holes 1230. The idea is to consider a multilayer board with example stack-up thicknesses depicted in 1220, with a total thickness of 1.6 mm. The thicknesses shown, and number of signal trace layers, are for example only. The disclosed inductive current sense coil could be implemented in a variety of PCB configurations.

Figure 13:
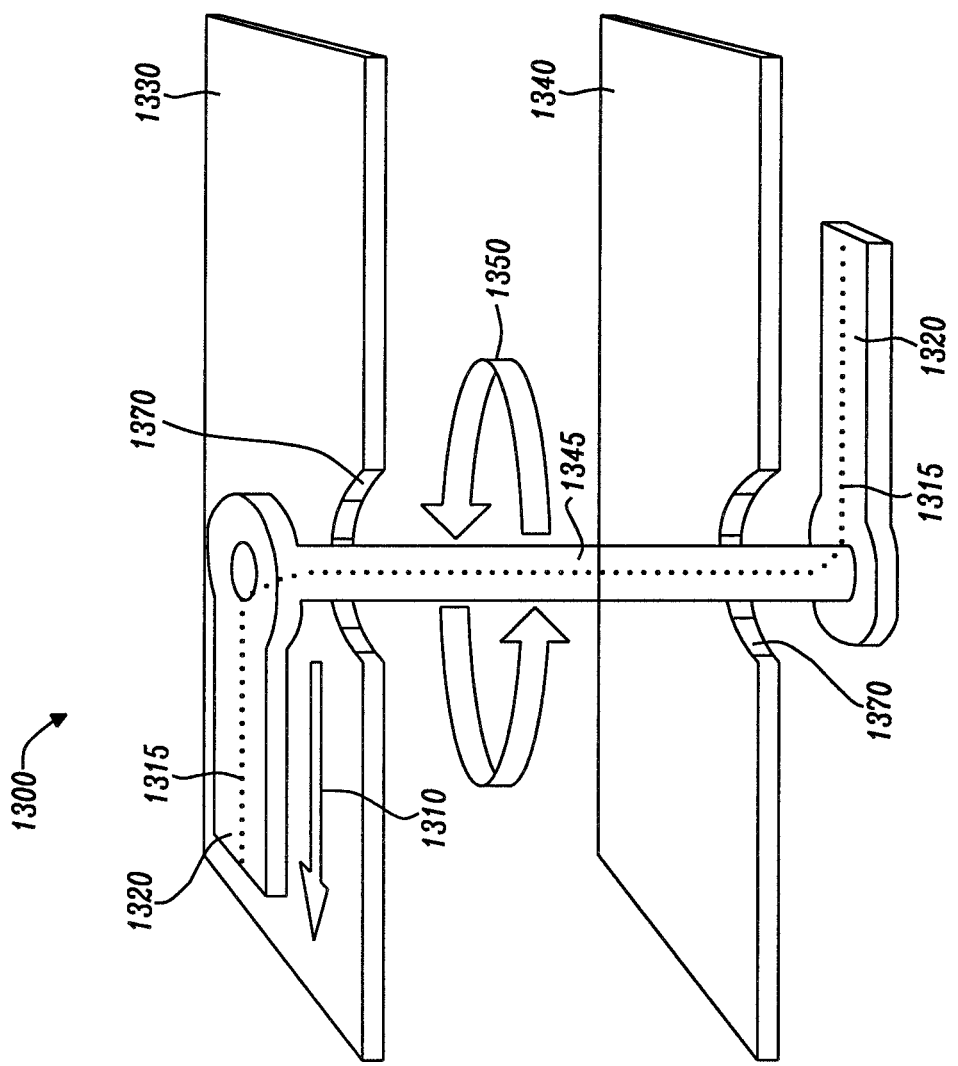
FIG. 13 illustrates layer transition of a current carrying conductor for a PCB trace connecting a buck switching converter output to a load.

FIG. 13 illustrates layer transition 1300 of a current carrying conductor for a PCB trace connecting a buck switching converter output to a load. Very often it happens that the PCB trace has to change layers, due to the high density of the interconnections and components on the board. Here, the PCB trace is interrupted and has to pass through conductive traces from current carrying conductor layer 1330, to be connected to layer 1340, with current flowing along the dotted line 1315. The direction of the current sensed flowing through the PCB trace is illustrated by arrow 1310. The PCB trace has horizontal elements 1320, and a vertical via connection 1345. Arrows 1350 show the lines of force of the magnetic field induced by the current flowing in the vertical via connection 1345. The coil used to sense the current is built around a barrel surrounding vertical via connection 1345, connecting two layers and using a circular topology, where the areas 1370 represent the top and bottom portions of the barrel. Arrows 1350 represent the inductive sense topology, the lines of force of the magnetic field and also, as the coils intercepts the lines of force, the topology of the inductive sense.

Figure 14:
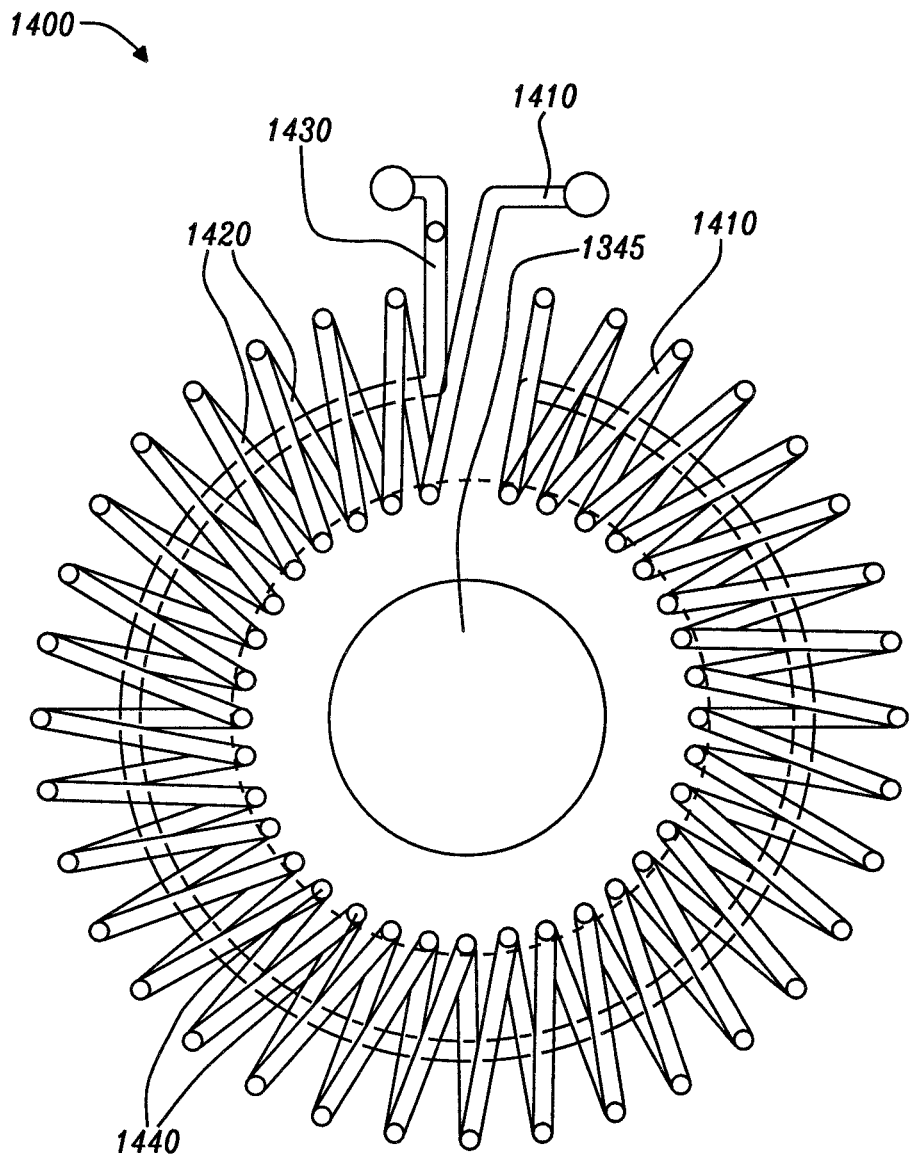
FIG. 14 shows a top view of a sense coil constructed around the vertical via connections of the current carrying track.

FIG. 14 shows top view of sense coil 1400, constructed around a vertical via connection 1345 of the current carrying track. It is possible to build all around the via-hole a sense coil, by using intermediate layers. For a board stack-up of FIG. 12, the PCB trace connection could go, for example, from the top layer, to Layer SIGNAL_7. The sense coil could be built between Layer SIGNAL_2 (1410), and Layer SIGNAL_6 (1420). Return wire 1430 lays in the middle, here in Layer SIGNAL_4, and Layer SIGNAL_2 and SIGNAL_6 are connected by stacked and buried microvias. The microvias allow the layout to reduce distance among windings and, consequently, increase the number of windings, in addition to reducing the inner radius of the coil. The central plate is used as a link for the via-holes in parallel, and also used to minimize the distance between the inner circle of the coil, and the source of magnetic field. The inner circle of the coil, represented by two of a plurality of connections 1440, represents the area within which the vias connecting two layers are placed, as seen from above. In other words, the circle is equivalent to the barrel referred to above with regard to FIG. 13. The diameter of openings 1370 may differ from the diameter of the inner circle of the coil.

The arrangement of FIG. 14 optimizes the number of sense coil turns, while reducing the distance from the power track to the sense coil, and maximizing the sense output signal. Other arrangements of the sense coil can be created, depending on the physical PCB track design, and available layers and space.

Figure 15:
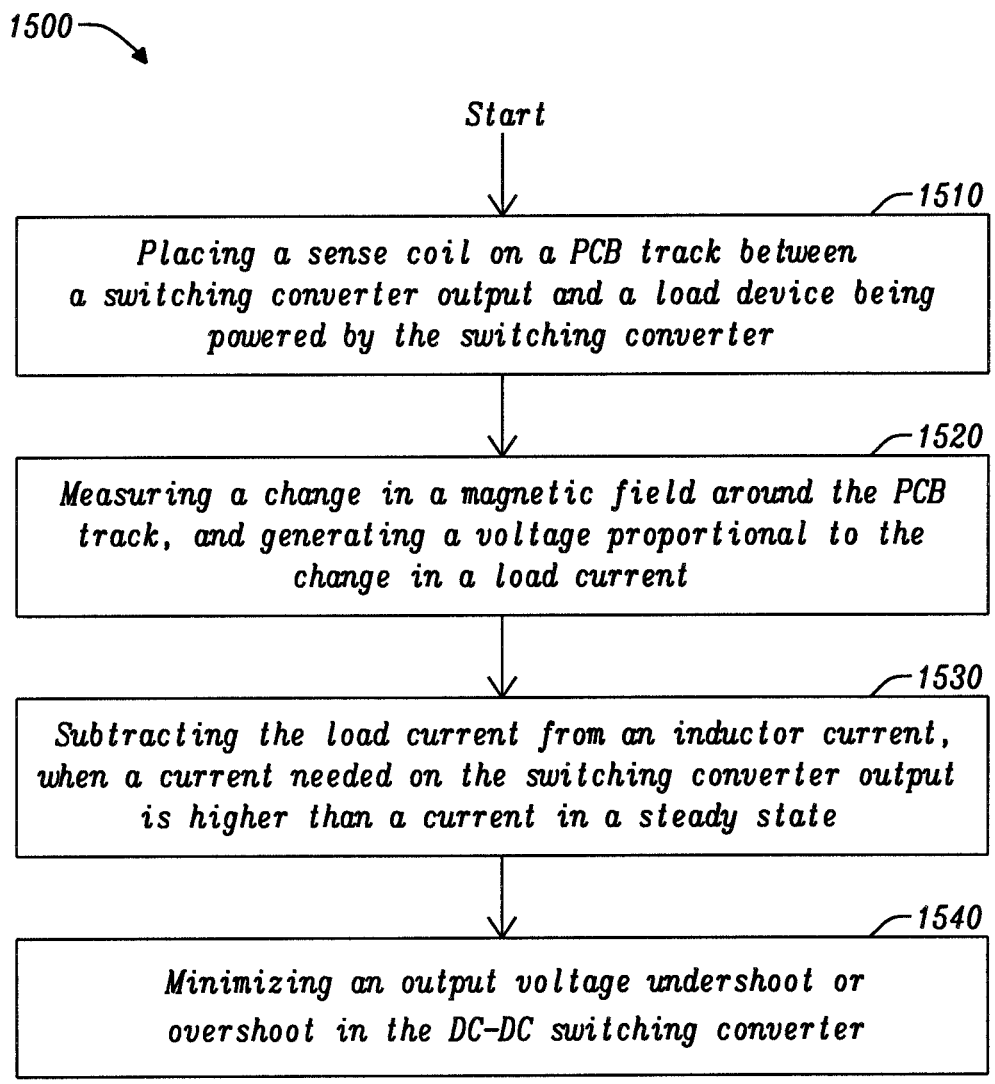
FIG. 15 is a flow chart of a method for Inductive Current Sensing in a DC-DC switching converter.

FIG. 15 is flow chart 1500 of an inductive current sensing method for a DC-DC switching converter, having a control loop implemented with a sense coil. The steps include 1510, placing the sense coil on a PCB track between the switching converter output and a load device powered by the switching converter. The steps also include 1520, measuring a change in a magnetic field around the PCB track, and generating a voltage proportional to the change in a load current. The steps also include 1530, subtracting the load current from an inductor current, when a current needed on the switching converter output is higher than a current in a steady state. The steps also include 1540, minimizing an output voltage undershoot or overshoot in the DC-DC switching converter.

The advantages of one or more embodiments of the present disclosure include faster response to transient load steps on the output of the switching converter, minimizing any undershoot on the output voltage. This technique allows the switching inductor(s) current to be increased to accommodate the increase in load current, as soon as the load current changes. It may also allow the reservoir capacitor size to be reduced, or the ESR of the capacitor to be larger, helping to reduce the bill of materials (BOM) cost. Similarly, when a load current step is removed, the potential for voltage undershoot can be reduced, triggering a reduction in the switching inductor(s) current.

While particular embodiments of the present disclosure have been illustrated and described, it will be understood by those skilled in the art that various changes in form and details may be made without departing from the spirit and scope of the invention.

The invention claimed is:

1. A DC-DC switching converter, including a multiple output switching converter, comprising:
   A sense coil, configured to measure a change in a magnetic field around a PCB track, and to generate a voltage proportional to a change in a load current, built on top of said PCB track between an output of said switching converter and said load powered by said switching converter, and placed after an LC filter, in order to detect a load current slew rate for the switching converter;
   a load current compensation circuit, configured to minimize an undershoot or an overshoot voltage on the switching converter output, using said sense coil;
   wherein said load current compensation circuit is configured to calculate a difference between a sense coil current and said load current using a scaled voltage replication of a load current profile.

2. The DC-DC switching converter of claim 1, wherein said load current compensation circuit is configured to subtract a load current from an inductor current, when a current needed on said output of said switching converter is higher than a current in a steady state.

3. The DC-DC switching converter of claim 1, further comprising an inner current loop to regulate a current peak according to a control signal.

4. The DC-DC switching converter of claim 3, further comprising an outer voltage loop to regulate said output of said switching converter and to generate said control signal for said inner current loop, wherein said control signal is determined by said load current.

5. The DC-DC switching converter of claim 3, further comprising said control signal input to a current-programmed controller.

6. The DC-DC switching converter of claim 1, wherein said load current compensation circuit is configured to activate a reduction in said overshoot voltage, to discharge an output capacitor, in said switching converter.

7. The DC-DC switching converter of claim 1, wherein said DC-DC switching converter is a step-down or buck converter, a step-up or boost converter, a buck-boost converter, or any other type.

8. The DC-DC switching converter of claim 1, further comprising a current sense integrator, configured to detect a voltage across a secondary coil, and to reproduce said load current profile of the switching converter.

9. The DC-DC switching converter of claim 1, wherein said load current compensation circuit further comprises a peak current modulator, configured to receive said difference between said output of said switching converter and said reference voltage.

10. The DC-DC switching converter of claim 9, wherein said load current compensation circuit further comprises a type II compensator, configured to drive said peak current modulator.

11. The DC-DC switching converter of claim 10, wherein said type II compensator has a 100 KHz crossover frequency.

12. A sense coil, in a DC-DC switching converter, comprising: a current carrying conductor, further comprising: a PCB trace and vertical via holes, on a multilayer board; wherein the sense coil is air-cored and constructed around a vertical via hole, connecting two layers in the PCB trace, when the PCB trace changes layers in the multilayer board;
   wherein the sense coil is built on top of the PCB trace, between the DC-DC switching converter and a load; and
   wherein a plurality of said vertical via holes are connected in parallel with a central plate, to minimize an inner radius of the sense coil, and are connected to minimize a distance between the inner radius of the sense coil and a source of a magnetic field.

13. The sense coil of claim 12, wherein multiple vertical via holes are connected to reduce distance among windings, and to increase the number of windings.

14. The sense coil of claim 12, wherein the sense coil is constructed according to board layers of the multilayer board and physical design space.

15. The sense coil of claim 12, wherein the multilayer board has a total stack-up thickness of about 1.6 mm.

16. An inductive current sensing method for a DC-DC switching converter, having a control loop implemented with a sense coil, comprising:
   building the sense coil on top of a PCB track between the switching converter output and a load powered by the switching converter;
   placing the sense coil after an LC filter, in order to detect a load current slew rate for the switching converter;
   measuring a change in a magnetic field around the track, and generating a voltage proportional to a change in a load current using the sense coil;
   calculating a difference between a sense coil current and the load current using a scaled voltage replication of a load current profile;
   subtracting the load current from said sense coil current, when a current needed on the switching converter output is higher than a current in a steady state; and
   minimizing an undershoot or overshoot in the DC-DC switching converter.

17. The method of claim 16, further comprising regulating a current peak according to a control signal using an inner current loop.

18. The method of claim 17, wherein an outer voltage loop regulates the switching converter output and generates the control signal for the inner current loop, and the load device current determines the control signal.

19. The method of claim 16, further comprising integrating the voltage from said sense coil, to reproduce said load current profile.

* * * * *